(12) United States Patent
Polland et al.

(10) Patent No.: US 8,547,994 B2
(45) Date of Patent: Oct. 1, 2013

(54) POINT TO MULTIPOINT CROSSLINK

(75) Inventors: Joe Polland, Eden Prairie, MN (US); Manish Kumar Sharma, Eden Prairie, MN (US); Xinkuan Zhou, Chapel Hill, NC (US)

(73) Assignee: ADC DSL Systems, Inc., Shakopee, MN (US)

( * ) Notice: Subject to any disclaimer, the term of this patent is extended or adjusted under 35 U.S.C. 154(b) by 413 days.

(21) Appl. No.: 12/948,971

(22) Filed: Nov. 18, 2010

(65) Prior Publication Data

US 2011/0064092 A1 Mar. 17, 2011

Related U.S. Application Data

(62) Division of application No. 12/036,644, filed on Feb. 25, 2008, now Pat. No. 7,856,036.

(60) Provisional application No. 60/892,015, filed on Feb. 28, 2007.

(51) Int. Cl.
*H04L 12/66* (2006.01)

(52) U.S. Cl.
USPC ............................ 370/463; 370/458; 370/498

(58) Field of Classification Search
USPC .......................................... 370/463, 498, 458
See application file for complete search history.

(56) References Cited

U.S. PATENT DOCUMENTS

| | | | |
|---|---|---|---|
| 5,452,306 A | 9/1995 | Turudic et al. | |
| 5,812,786 A | 9/1998 | Seaholtz et al. | |
| 5,881,059 A | 3/1999 | Deschaine et al. | |
| 6,320,876 B1 | 11/2001 | Virdee et al. | |
| 7,088,742 B2 | 8/2006 | Oliver et al. | |
| 2003/0091061 A1* | 5/2003 | Oliver et al. | 370/463 |
| 2007/0195872 A1* | 8/2007 | Diaz | 375/222 |
| 2008/0019501 A1 | 1/2008 | Miller, III et al. | |
| 2008/0130688 A1* | 6/2008 | Polland | 370/498 |

FOREIGN PATENT DOCUMENTS

EP 0760563 3/1997

OTHER PUBLICATIONS

Rup et al, "SHDSL Technology Complementing Other Transport Technologies", "EUROCON 2003. Computer as a Tool. The IEEE Region 8", Sep. 22, 2003, pp. 229-232, vol. 1, Publisher: IEEE, Published in: Piscataway, NJ.

* cited by examiner

*Primary Examiner* — Albert T Chou
(74) *Attorney, Agent, or Firm* — Fogg & Powers LLC (57) ABSTRACT

A communication network comprises a first central digital subscriber line (DSL) unit having at least one application port and a plurality of DSL ports; a first remote DSL unit having at least one application port and at least one DSL port, wherein the first remote DSL unit is communicatively coupled to the central DSL unit via a first single independent DSL pair having a first EOC channel; and a second remote DSL unit having at least one application port and at least one DSL port, wherein the second remote DSL unit is communicatively coupled to the central DSL unit via a second single independent DSL pair having a second EOC channel; wherein the at least one application port in the central DSL unit is communicatively coupled to an application port in at least one of the first remote DSL unit and the second remote DSL unit.

18 Claims, 10 Drawing Sheets

| 1:1 Cross Connect Summary | |
|---|---|
| 1st Unit Port | 2nd Unit Port |
| G.703 | Nx64k |
| G.703 | Ethernet |
| Nx64k | G.703 |
| Nx64k | Ethernet |
| Ethernet | G.703 |
| Ethernet | Nx64k |

POINT TO MULTIPOINT CROSSLINK

CROSS-REFERENCE TO RELATED APPLICATIONS

This application is a continuation of application Ser. No. 12/036,644 filed on Feb. 25, 2008 and entitled "POINT TO MULTIPOINT CROSSLINK" (currently pending), which, in turn, claims the benefit under 35 USC 119(e) of prior provisional application 60/892,015, filed Feb. 28, 2007 entitled "POINT TO MULTIPOINT CROSSLINK," hereby incorporated herein by reference.

This application is related to co-pending United States patent application Ser. No. 12/036,663, filed on Feb. 25, 2008, entitled "MEDIA CONVERTER" (currently pending), hereby incorporated herein by reference, and referred to herein as the "'823 Application".

This application is related to co-pending United States patent application Ser. No. 12/036,678, filed on Feb. 25, 2008, entitled "CROSS-LINK" (currently pending), hereby incorporated herein by reference, and referred to herein as the "'824 Application".

BACKGROUND

A typical digital subscriber line (DSL) communication network consists of a local unit and remote units, connected together by DSL. Each unit can be equipped with various application interfaces such as G.703, Ethernet, and Nx64k. The application interface formats are transported between units over DSL pairs, such as over G.SHDSL (G.991.2) interfaces. In this manner a user is able to connect interfaces of the same type on different units. For example, a G.703 interface on a local unit may be connected to a G.703 interface on a remote unit.

SUMMARY

In one embodiment, a communication network is provided. The communication network comprises a first central digital subscriber line (DSL) unit having at least one application port and a plurality of DSL ports; a first remote DSL unit having at least one application port and at least one DSL port, wherein the first remote DSL unit is communicatively coupled to the central DSL unit via a first single independent DSL pair having a first EOC channel; and a second remote DSL unit having at least one application port and at least one DSL port, wherein the second remote DSL unit is communicatively coupled to the central DSL unit via a second single independent DSL pair having a second EOC channel; wherein the at least one application port in the central DSL unit is communicatively coupled to an application port in at least one of the first remote DSL unit and the second remote DSL unit.

In another embodiment, a DSL unit is provided. The DSL unit comprises a plurality of application ports; two DSL ports, each DSL port associated with an independent embedded operations channel (EOC) and a single DSL pair; wherein the DSL unit is configured to extract timeslots from a signal received over one of the plurality of application ports, transmit a first subset of the extracted timeslots to a first remote DSL unit coupled to one of the at least two DSL ports, and transmit a second subset of the extracted timeslots to a second remote DSL unit coupled to the other DSL port.

DRAWINGS

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

Embodiments of the present invention enable more flexibility in a DSL communication network by allowing a user to connect different interface types to each other. For example, a local G.703 interface can be connected to a remote Ethernet interface. Ethernet is a local area network technology. Therefore, when connecting a remote Ethernet port to a local G.703 port, the user is able to distribute the Ethernet to a remote location using the telephone network, or other mechanisms available to distribute G.703 remotely. In addition, embodiments of the present invention enable an application port in a central unit to be communicatively coupled to an application port in more than one remote unit, thereby reducing the number of needed DSL units. Hence, more flexibility is enabled in embodiments of the present invention than in a typical DSL communication network.

Figure 1:
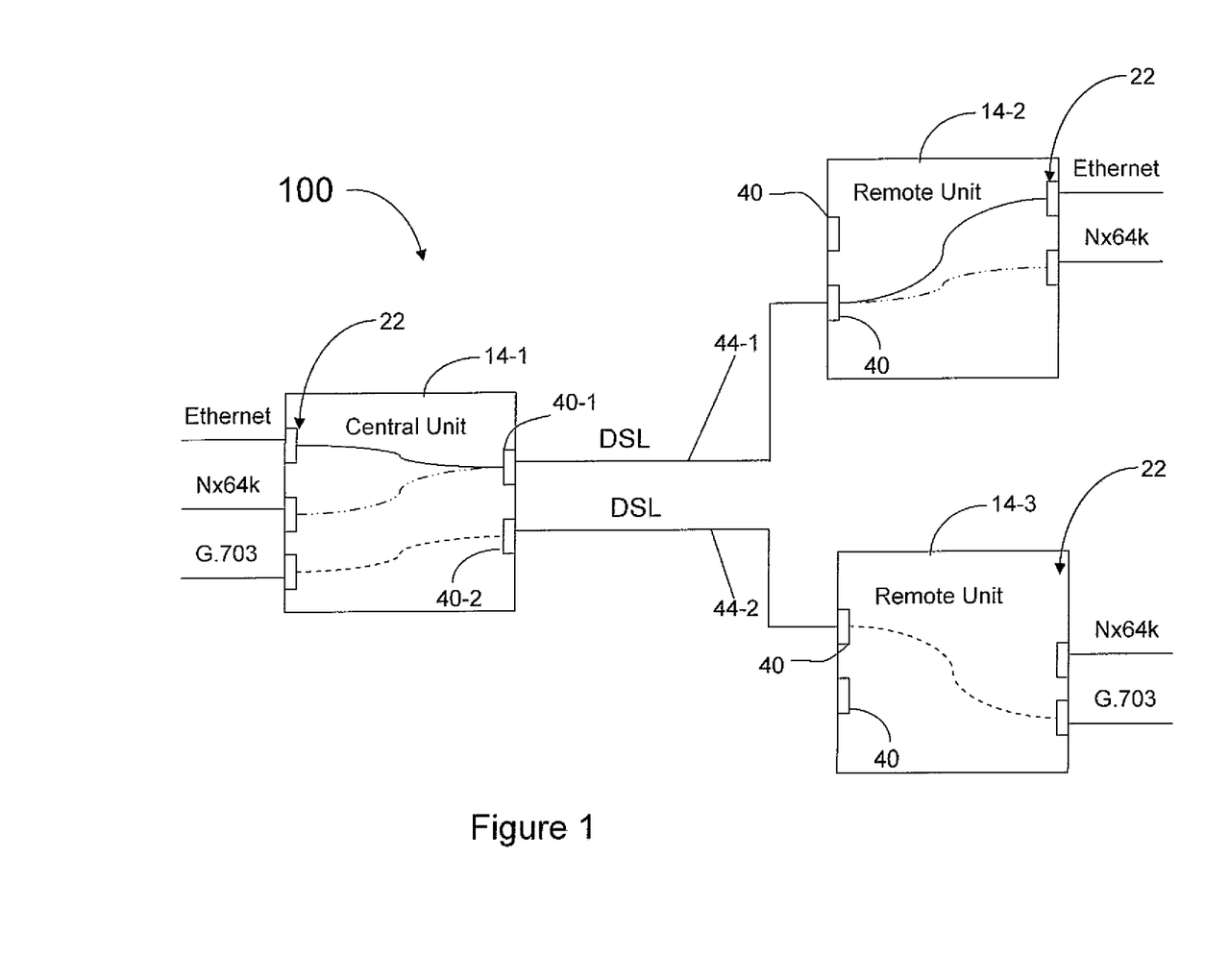
FIG. 1 is a block diagram of a communication network according to one embodiment of the present invention.

FIG. 1 is a block diagram of a communication network 100 according to one embodiment of the present invention. Network 100 includes three DSL units 14-1, 14-2 and 14-3. DSL unit 14-1 is configured as a central unit (also known as an STU-C or ATU-C) whereas each of DSL units 14-2 and 14-3 are configured as remote units (also known as an STU-R or ATU-R). DSL units 14-2 and 14-3 are communicatively coupled to DSL unit 14-1 via DSL pair 44-1 and 44-2 respectively. Each DSL pair 44 is connected to a respective DSL port 40 in each of DSL units 14-1, 14-2 and 14-3. In addition, each DSL pair 44 operates in single-pair mode. Note that in FIG. 1, each of remote DSL units 14-2 and 14-3 has an unconnected DSL port 40. In some embodiments, the unconnected DSL port 40 can be connected to another central DSL unit.

In this embodiment, each of DSL units 14-1 to 14-3 are configured according to the Global.standard High-Bit-Rate Digital Subscriber Line (G.SHDSL) standard. For example, an exemplary DSL unit suitable for embodiments of the present invention is the WorldDSL™ G.SHDSL modem manufactured by ADC, Inc.

DSL unit 14-1 uses independent embedded operations channels (EOC) to configure remote DSL units 14-1 and 14-2. That is, a separate and independent EOC channel is used over DSL pair 44-1 to configure DSL unit 14-2. Similarly, a separate and independent EOC channel is used over DSL pair 44-2 to configure DSL unit 14-3. Hence, an error in DSL unit 14-2 or DSL pair 44-1 does not affect operation of DSL unit 14-3 or DSL pair 44-2, and vice versa. Each remote DSL unit 14-1 and 14-2 has separate alarms that are conveyed via the independent EOC channels. Therefore, if DSL unit 14-2 is restarted to correct an error, DSL unit 14-1 clears alarms corresponding to DSL unit 14-2 only and does not make changes to alarms corresponding to DSL unit 14-3, and vice versa.

Each of DSL units 14-1 to 14-3 has one or more application ports 22. In particular, in the example in FIG. 1, DSL unit 14-1 has three application ports 22, and DSL units 14-2 and 14-3 each have two application ports 22. Notably, the number of application ports 22 shown in FIG. 1 is provided by way of example and not by way of limitation. Each application port 22 is configured for a different interface format. For example, in this embodiment the three interface formats used in DSL unit 14-1 are G.703, Nx64k, and Ethernet. However, other interface formats can be used in other embodiments.

The G.703 interface format is an International Telecommunication Union Telecommunication (ITU-T) standard for transmitting voice or data over digital carriers such as T1 and E1. G.703 provides the specifications for pulse code modulation. In one implementation of this embodiment, G.703 is sent over balanced 120 ohm twisted pair cables terminated in RJ-45 jacks. In addition, G.703 can operate in one of two modes: structured and unstructured. The structured mode is a frame format having a specified length for the timeslots. The unstructured mode is a continuous byte stream of 2 Mbytes.

The Nx64k interface format is a timeslot based format, which is configured with rates up to 178 timeslots. Nx64k is a generic term and an application port for Nx64k format can be configured according to V.35, V.36, X.21, or RS-530 standards. The Ethernet format used in this embodiment is 10/100 Base T Ethernet format. Additionally, the Ethernet application port is either full or half duplex and is configured using auto negotiation and auto-medium-dependent-interface (MDI)/MDI-x. In one implementation of this embodiment, the Ethernet application port is manually configured.

In conventional networks, an application port in a central unit is communicatively coupled only to a similar application port using the same interface format in a single remote unit. However, in the embodiment of FIG. 1, application ports in DSL unit 14-1 is communicatively coupled to a similar application port in one of DSL units 14-2 and 14-3. In particular, Ethernet and Nx64k application ports in DSL unit 14-1 are coupled to corresponding Ethernet and Nx64k application ports in DSL unit 14-2. Also, G.703 interface application port in DSL unit 14-1 is coupled to G.703 interface application port in DSL unit 14-3. In conventional networks, two central units would be needed to achieve the communicative couplings shown in FIG. 1. That is, one central unit would be used to couple the G.703 interface application ports and another to couple the Ethernet and Nx64k application ports. Therefore, the embodiment of FIG. 1 enables the advantage of only requiring one central unit.

Figure 2:
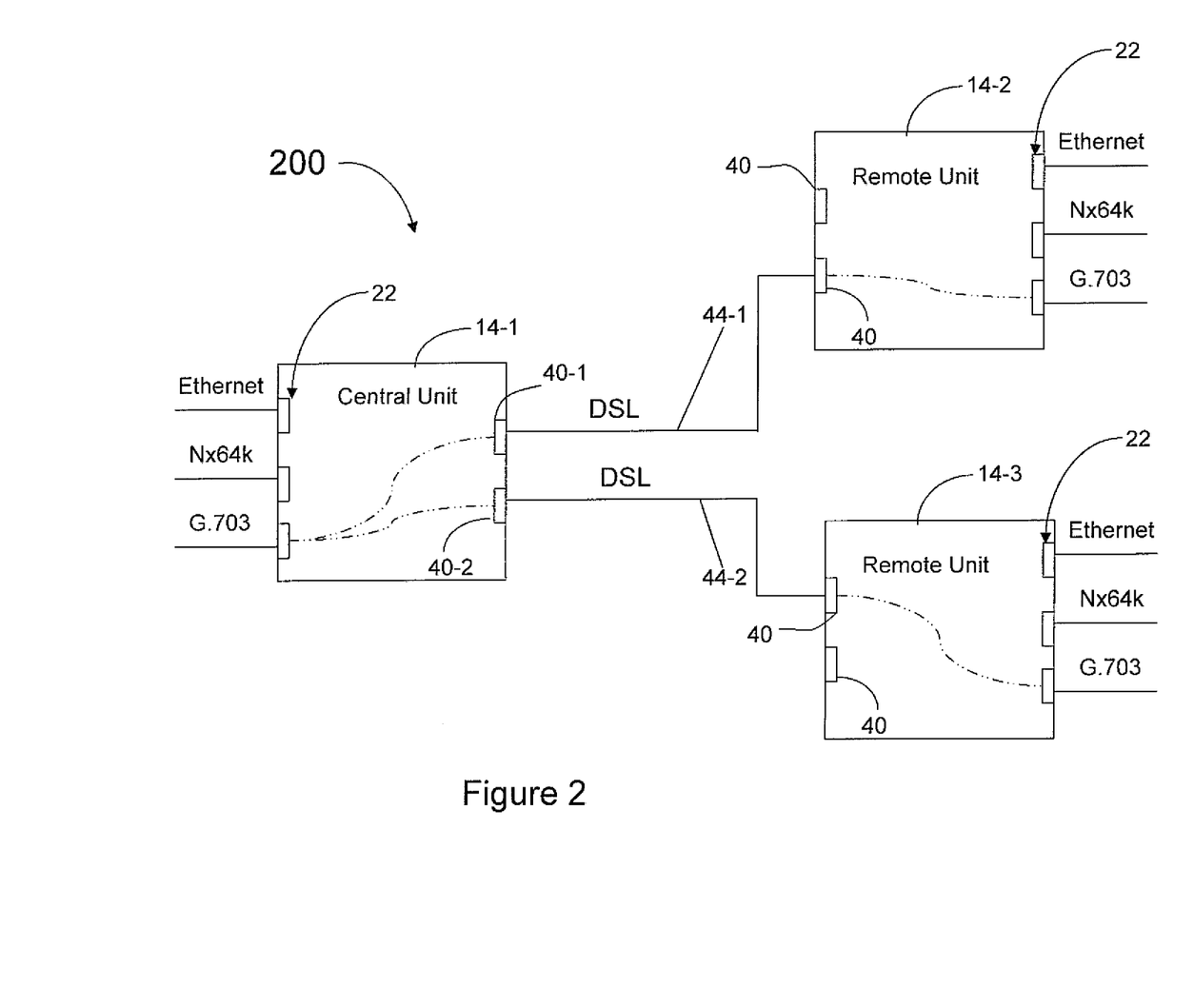
FIG. 2 is another block diagram of a communication network according to one embodiment of the present invention.

FIG. 2 is another block diagram of a communication network 200 according to one embodiment of the present invention. The elements of network 200 are similar to those in network 100 and described above with regards to FIG. 1. In the configuration shown in FIG. 2, a G.703 interface application port in DSL unit 14-1 is communicatively coupled to a G.703 interface application port in both DSL units 14-2 and 14-3. Each coupling (e.g. DSL units 14-1/14-2 and DSL units 14-1/14-3) is independent of the other. However, the combined bandwidth of the two couplings can not exceed the bandwidth available at the G.703 interface application port in DSL unit 14-1. Therefore, the timeslots available at the G.703 interface application port in DSL unit 14-1 are shared between the two remote DSL units 14-2 and 14-3.

Figure 3:
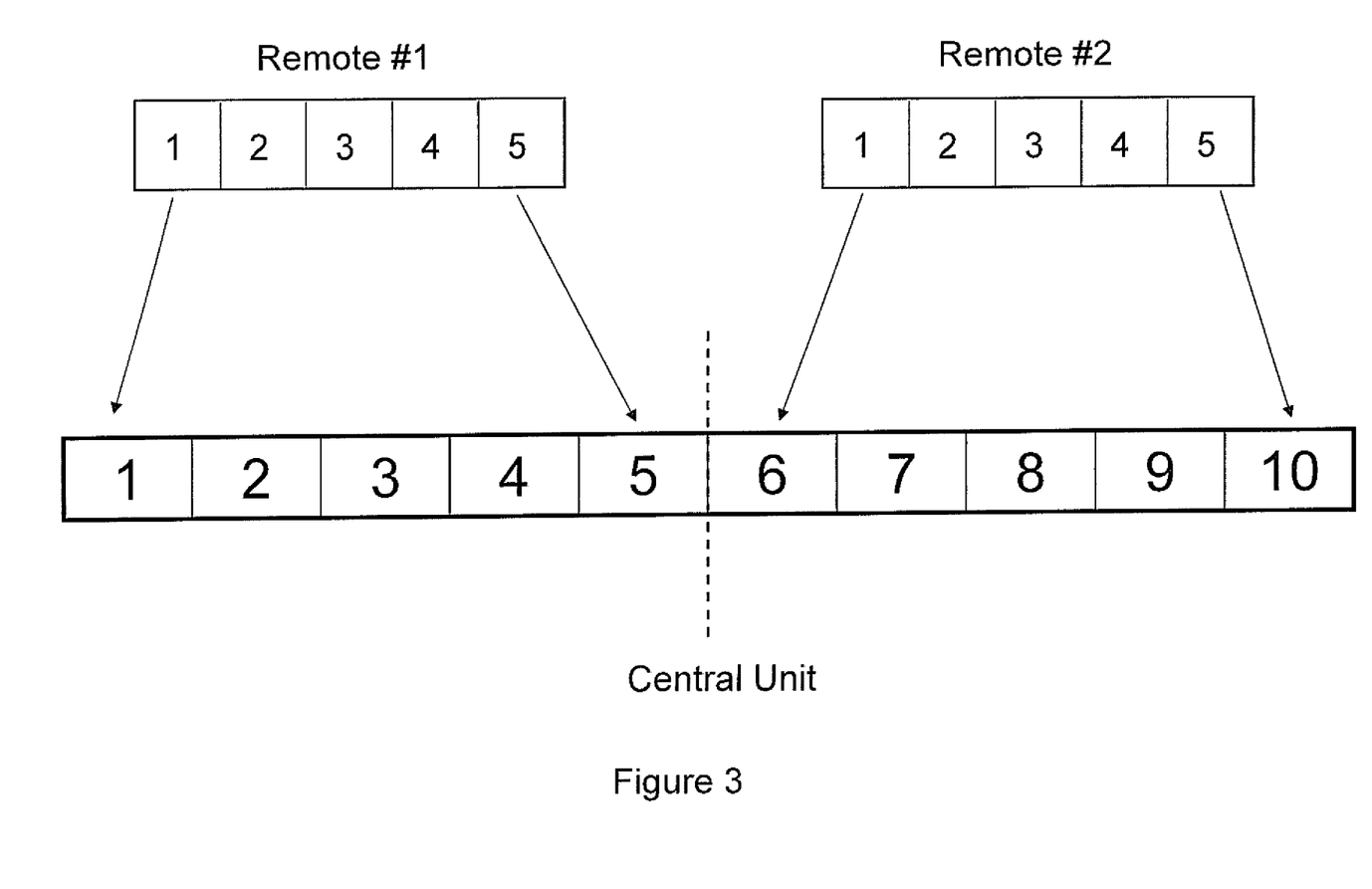
FIG. 3 is an exemplary diagram representing timeslots assigned to DSL units according to one embodiment of the present invention.

In particular, in one embodiment a user configured the data rate and bandwidth available to each remote DSL unit 14-2 and 14-3 at the central DSL unit 14-1. DSL unit 14-1 communicates the configuration to each DSL unit via its respective EOC channel. For example, FIG. 3 is a diagram representing available timeslots in a central unit and corresponding timeslots for each of two remote units. As shown in FIG. 3, timeslots 1-5 of the first remote unit are assigned timeslots 1-5 of the central unit. Accordingly, timeslots 1-5 of the second remote unit are assigned timeslots 6-10 of the central unit.

Notably, the timeslot assignments are provided by way of example and not by way of limitation. In particular, any appropriate number of timeslots can be assigned to either remote unit so long as the total bandwidth does not exceed the available bandwidth of the central unit port. In addition, timeslots assigned to a given remote unit must be contiguous. For example, remote unit #1 could not be assigned timeslots 1, 3, and 5 without also being assigned timeslots 2 and 4. Hence, a structured G.703 mode is used in the embodiment of FIG. 2 since an unstructured mode does not provide the ability to locate individual timeslots. Also, although FIG. 2 discusses a G.703 interface, it is to be understood that similar couplings can be made with other interface formats such as the Nx64k interface format.

Figure 4:
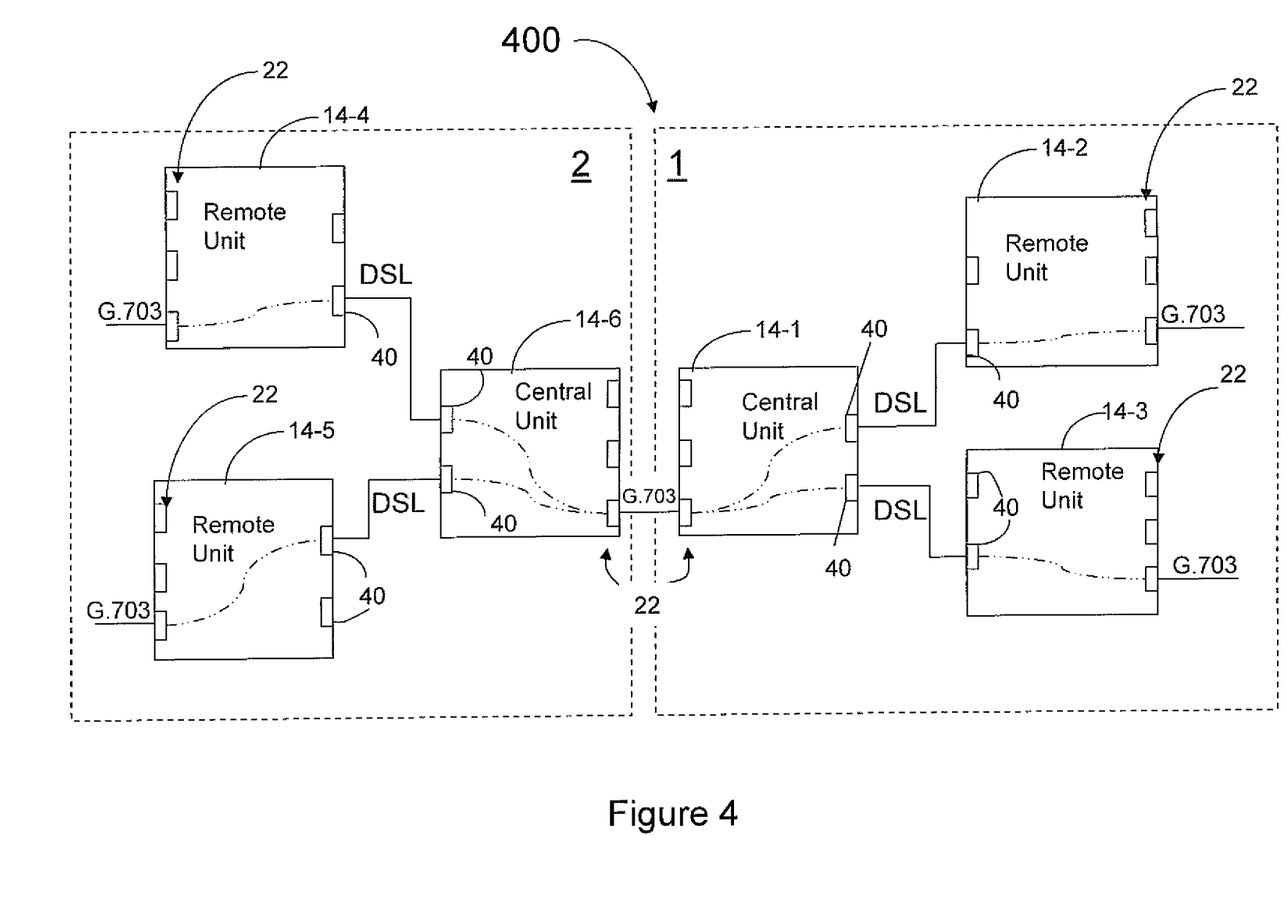
FIG. 4 is another block diagram of a communication network according to one embodiment of the present invention.

FIG. 4 is another block diagram of a communication network 400 according to one embodiment of the present invention. The elements of network 400 are similar to those in network 100 and described above with regards to FIG. 1. In the configuration shown in FIG. 4, DSL units 14-1 to 14-6 comprise two groups. Group 1 consists of DSL units 14-1, 14-2, and 14-3. Group 2 consists of DSL units 14-4, 14-5, and 14-6. Each of groups 1 and 2 operates similarly to network 200 described above. In particular, each of DSL units 14-1 and 14-6 are each configured as central units. Hence, communication between DSL unit 14-1 and remote DSL units 14-2 and 14-3 occurs as described above. Similarly, communication between DSL unit 14-6 and remote DSL units 14-4 and 14-5 occur as described above.

The G.703 interface between DSL units 14-1 and 14-6 is used as a transport mechanism only. Also, G.703 operates in structured mode in the embodiment shown in FIG. 4 with timeslot 16 used for payload between DSL units 14-1 and 14-6. A user specifies the data rate/number of timeslots to be used by each remote DSL unit via its respective central unit. For example, DSL unit 14-6 is used to specify the data rate/ number of timeslots for remote DSL units 14-4 and 14-5. In this embodiment, the maximum number of timeslots available between each remote DSL unit and its corresponding central DSL unit is 30 timeslots. However, central units 14-6 and 14-1 disable timeslot 16 and use it for payload. Also, central units 14-6 and 14-1 terminate timeslot 0 on transmissions between each other. Therefore, the bandwidth available between central units 14-6 and 14-1 is 31 timeslots. Each central DSL unit 14-6 and 14-1 maps timeslots received from its corresponding remote DSL units to the 31 timeslots.

In operation, remote DSL units 14-4 and 14-5 each receive a G.703 signal over a G.703 interface application port. Remote DSL units 14-4 and 14-5 transmit a specified number of timeslots to central DSL unit 14-6 via DSL lines. Central DSL unit 14-6 receives the timeslots from each remote DSL unit and combines the timeslots in a G.703 signal through assigned timeslots as described above with regards to FIGS. 2 and 3. In each group of timeslots received from remote units 14-4 and 14-5, there is a timeslot 0. Central unit 14-6 does not treat this timeslot 0 specially. It maps timeslot 0 to the assigned timeslots as with the other timeslots. Central unit 14-6 transmits the combined signal over a G.703 interface to central DSL unit 14-1. Central unit 14-1 separates the timeslots of the combined signal according to an a priori configuration. Central unit 14-1 then transmits the corresponding separated timeslots to each of remote DSL units 14-2 and 14-3. Each of remote DSL units 14-2 and 14-3, receives its corresponding timeslots (including timeslot 0 from one of remote units 14-4 and 14-5) and transmits the G.703 signal over a G.703 interface application port. Hence, timeslots from remote units 14-4 and 14-5 are sent end to end via central units 14-1 and 14-6.

A similar process occurs in the reverse direction from remote DSL units 14-2 and 14-3 to remote DSL units 14-4 and 14-5. Hence, in this embodiment, the G.703 interface application port in DSL unit 14-4 is communicatively coupled to DSL unit 14-2 via DSL units 14-1 and 14-6. Similarly, DSL unit 14-5 is communicatively coupled to DSL unit 14-3 via DSL units 14-1 and 14-6. This allows for transport of the G.703 interfaces between remote DSL units.

Figure 5:
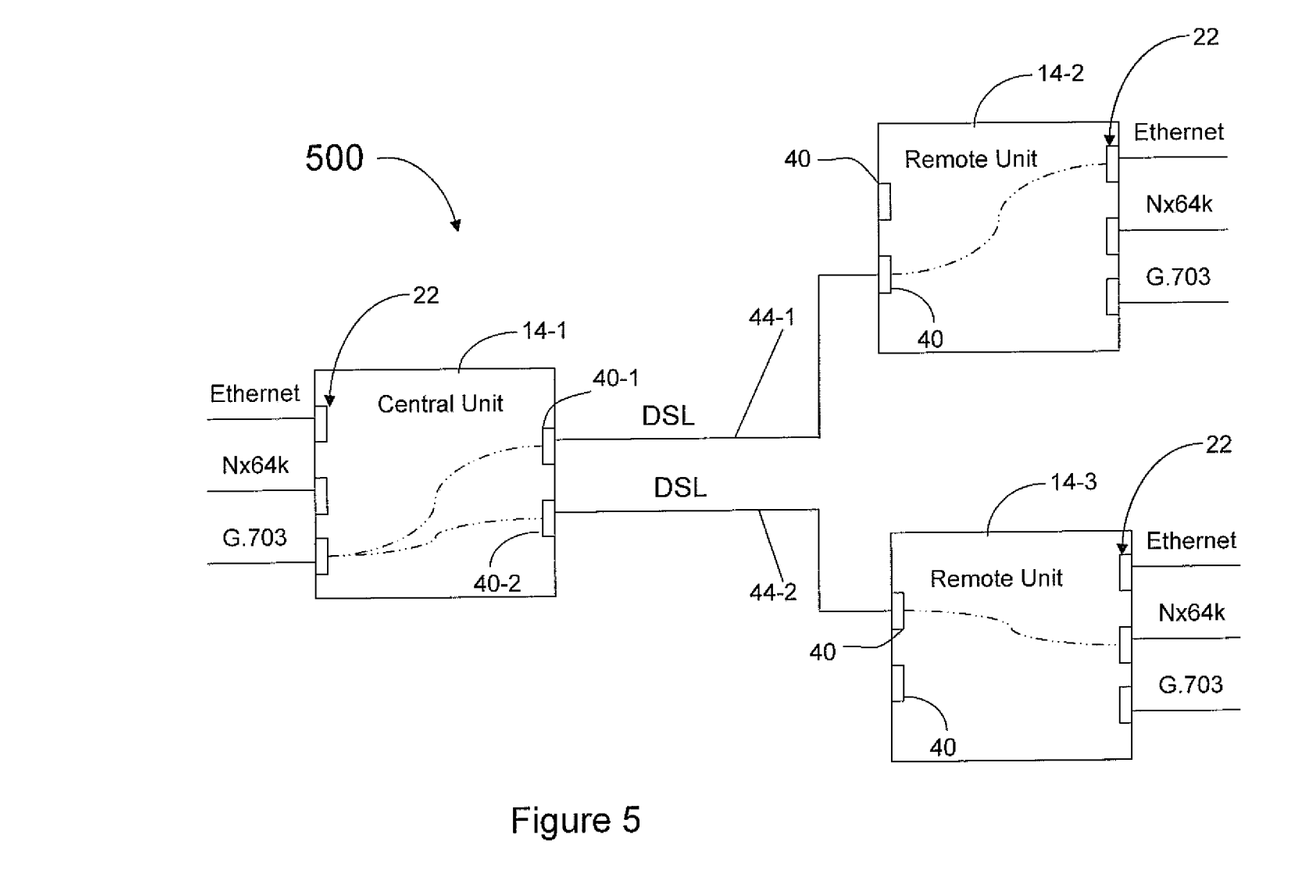
FIG. 5 is another block diagram of a communication network according to one embodiment of the present invention.

FIG. 5 is another block diagram of a communication network 500 according to one embodiment of the present invention. The elements of network 500 are similar to those in network 100 and described above with regards to FIG. 1. In the configuration shown in FIG. 4, an application port 22 in each of remote DSL units 14-2 and 14-3 is cross connected with the G.703 interface application port in DSL unit 14-1. In particular, the G.703 interface application port in DSL unit 14-1 is coupled to an Ethernet interface application port in DSL unit 14-2 and an Nx64k interface application port in DSL unit 14-3.

Figure 6:
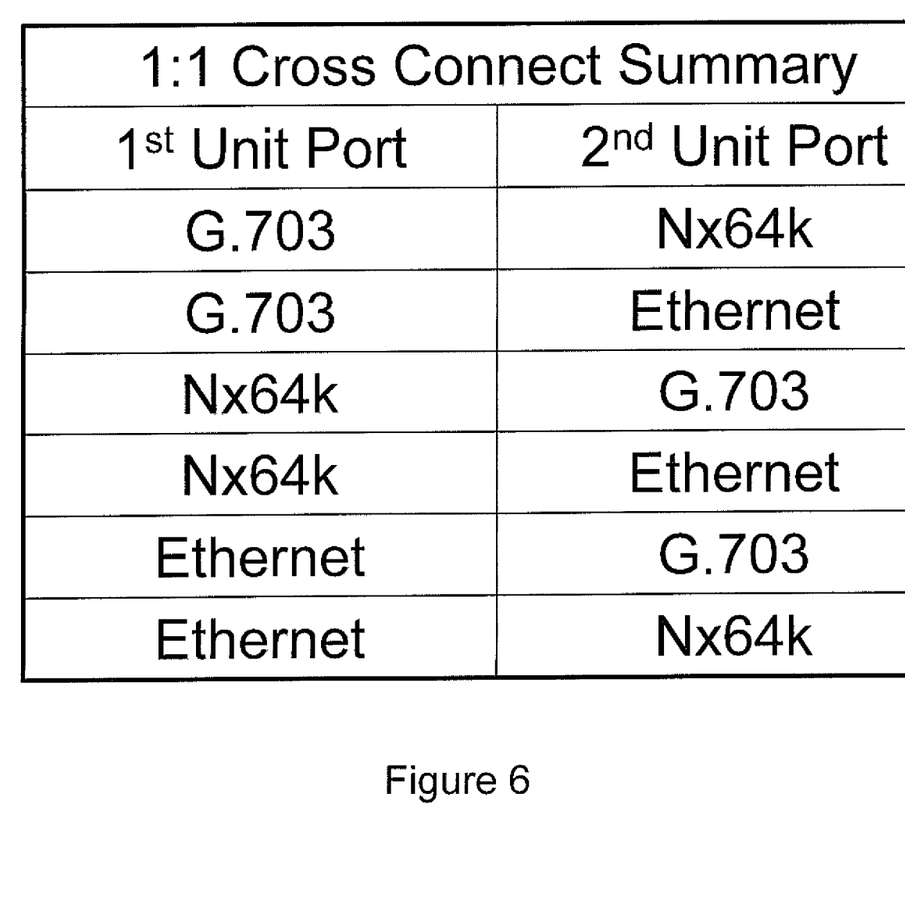
FIG. 6 is a table of one-to-one port relationships according to one embodiment of the present invention.

Each one-to-one cross-connect is independent of the other as with other configurations discussed above. In particular, DSL unit 14-1 uses independent EOC channels to control the configuration of remote DSL units 14-2 and 14-3. Exemplary one-to-one cross connects available in embodiments of the present invention, such as the cross connect between DSL units 14-1 and 14-3 in FIG. 5, are shown in the table in FIG. 6.

In enabling a cross connect, DSL units 14-1 to 14-3 are configured to allocate bandwidth such that the available bandwidth at an application port 22 of DSL unit 14-1 is not exceeded. For example, in FIG. 5, the combined bandwidth allocated to application ports 22 in DSL units 14-2 and 14-3 is configured so as not to exceed the total bandwidth of application port 22 in DSL unit 14-1. In addition, DSL units 14-1 to 14-3 are configured to convert between the different interface formats of the cross connects.

In converting an Ethernet signal to a signal of a different or dissimilar interface format, such as Nx64k or G.703, DSL units 14-1 to 14-3 strip a received Ethernet signal of the sync and the start of frame bytes. The stripped Ethernet frame is high-level data link control (HDLC) encoded. HDLC encoding involves appending a two byte cyclic redundancy check (CRC) using the polynomial $X16+X12+X5+1$. The Ethernet frame plus CRC is then examined for a continuous bit sequence of five 1's (that is, 11111). A zero is inserted at the end of each sequence of five 1's (that is, 111110). HDLC flags with the pattern "01111110" are also inserted at the beginning and end of the frame. Zero insertion after a sequence of five 1s in the payload is used to avoid confusion of payload with HDLC flags. The HDLC flags are used to identify the start and end of a frame. The HDLC encoded Ethernet frame is then inserted into timeslots to convert to Nx64 or G.703 interface formats. In the reverse direction, the HDLC flags are removed from the start and end of the frame. Similarly, the inserted "0" in the sequence "111110" is removed as well as the appended two byte CRC. The remaining Ethernet frame is then formatted with start of frame and sync bytes in an application port 22 configured for Ethernet signals and transmitted.

In converting a structured G.703 signal to a different or dissimilar interface format, DSL units 14-1 to 14-3 remove the timeslot 0 in a structured G.703 frame. The timeslot is regenerated in the reverse direction when transmitting a G.703 frame over a corresponding application port 22. Also, in some embodiments, DSL units 14-1 to 14-3 disable timeslot 16 of a structured G.703 in order to use the timeslot for payload rather than being used for signaling as in a typical G.703 frame.

After making the applicable adjustments discussed above, DSL units 14-1 to 14-3 convert data from one interface format to another through timeslot range mapping in this example. Timeslot range mapping maps a timeslot of one interface format to a corresponding timeslot in a second interface format. DSL units 14-1 to 14-3 use timeslot range mapping to map the structured G.703 signal to timeslots in dissimilar interface formats. For example, if 10 timeslots are being used, structured G.703 timeslots 1-10 are mapped with Nx64k timeslots 1-10 in timeslot range mapping. If G.703 timeslot 16 is disabled in structured mode, then G.703 timeslots 1-31 may be connected to Nx64k timeslots 1-31. If G.703 timeslot 16 is enabled, G.703 timeslots 1-15 may be connected to Nx64k timeslots 1-15, and G.703 timeslots 17-31 to Nx64k timeslots 16-30.

In addition, fractional timeslot mapping is used in some embodiments. If fractional timeslots are specified, a user may define matching ranges. For example, structured G.703 timeslots 1-5 mapped to Nx64k timeslots 6-10. In a one-to-one cross connect, an unstructured G.703 signal is constrained to a fixed bandwidth (for example 2 Mbits) to match the bandwidth of the dissimilar interface format to which the G.703 signal is mapped. However, unstructured G.703 signals are not used in embodiments where a G.703 interface application port is coupled to more than one application port in a different DSL unit. For example, the G.703 interface application port in DSL unit 14-1 is coupled to two separate application ports (one port in DSL unit 14-2 and one port in DSL unit 14-3). Hence, in the example shown in FIG. 5, unstructured G.703 mode is not used.

In operation, DSL unit 14-1 receives a signal over an application port having a first interface format. In this example, the first interface format is a G.703 interface format. DSL unit 14-1 extracts timeslots and terminates the signal. The extracted timeslots are then transported as payload over DSL pairs 44 to DSL units 14-2 and 14-3. In particular, DSL unit 14-1 transmits a first subset of the extracted timeslots to DSL unit 14-2 over DSL pair 44-1 and a second subset of the extracted timeslots to DSL unit 14-3 over DSL pair 44-2. The determination of which timeslots to transport to which remote DSL unit is made a priori as described above with regards to FIG. 3. DSL units 14-2 and 14-3 pass the received subset of extracted timeslots to the appropriate application port 22 configured for a dissimilar interface format. The interface format in DSL units 14-2 and 14-3 is referred to as dissimilar because it is not the same interface format used by the application port in DSL unit 14-1 over which the original signal was received. The extracted timeslots are used to create a new signal of a dissimilar interface format. The new signal originates at and is transmitted from the corresponding application port 22 in DSL units 14-2 and 14-3.

In the reverse direction, a similar process occurs. In particular, for a one-to-one cross connect, such as between DSL units 14-1 and 14-3, DSL unit 14-3 receives a signal in a dissimilar interface format (Nx64k in this example) over the corresponding application port 22. and converts the signal into the first interface format (G.703 in this example). DSL unit 14-3 extracts timeslots and terminates the signal in the dissimilar interface format application port 22. DSL unit 14-3 then transports the extracted timeslots as payload over DSL pair 44-2 to DSL unit 14-1. Similarly, DSL unit 14-2 extracts timeslots from a signal of a dissimilar interface format and transports the extracted timeslots to DSL unit 14-1 over DSL pair 44-1. DSL unit 14-1 maps the extracted timeslots from each of DSL units 14-2 and 14-3 to corresponding timeslots of a combined signal. The combined signal is passed to the corresponding application port 22 for the first interface format. The extracted timeslots in the combined signal are used to create a signal of the first interface format and transmitted over the corresponding application port 22 in DSL unit 14-1.

Figure 7:
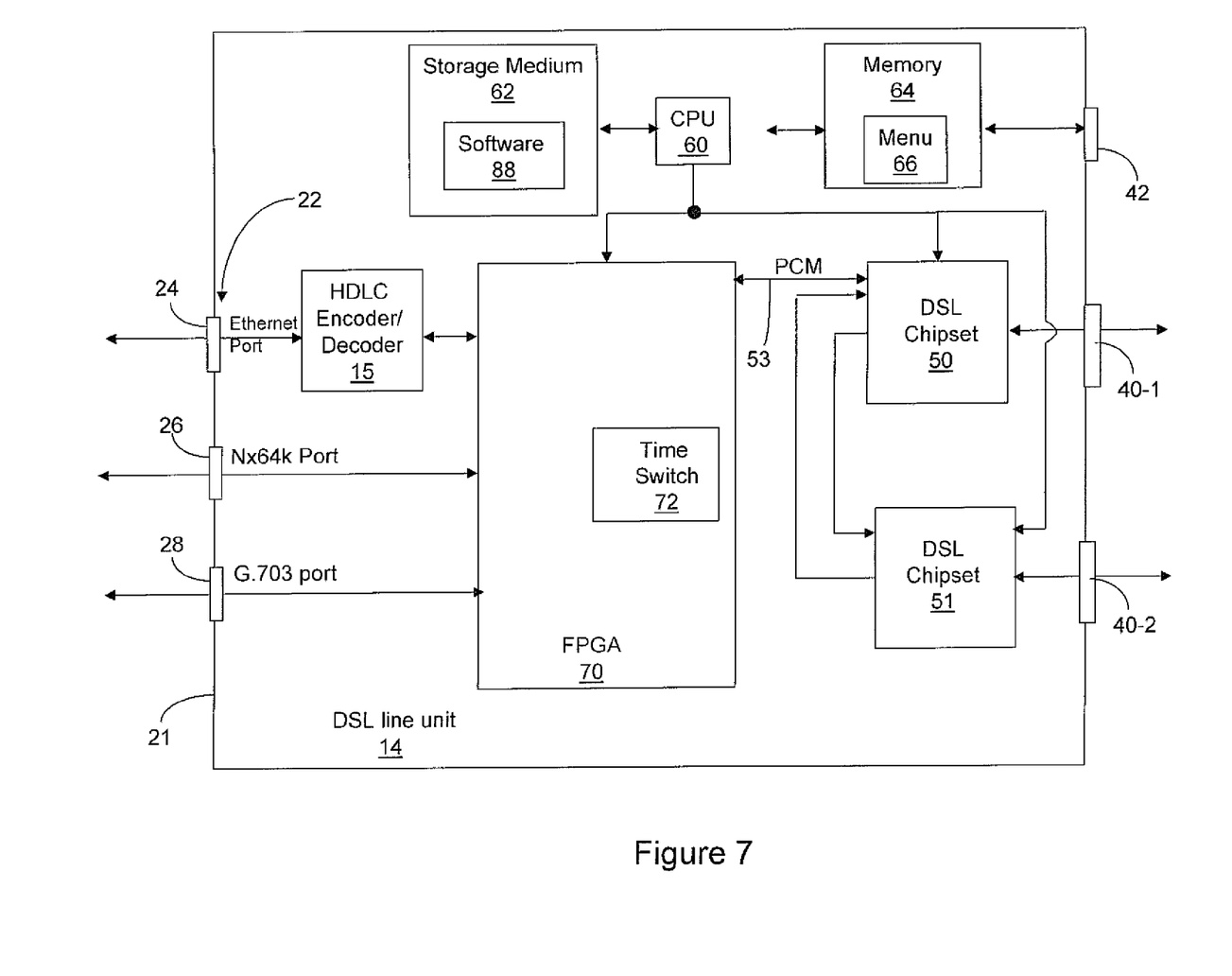
FIG. 7 is a block diagram of a DSL unit according to one embodiment of the present invention.

FIG. 7 is a block diagram of a DSL unit 14 according to one embodiment of the present invention. DSL unit 14 is used in a communication network such as networks 100, 200, 400, and 500. DSL unit 14 is configured as a central unit in this embodiment and includes a plurality of different types of application ports represented generally by the numeral 22. Specifically, there are three application ports 22, in this example, on the user interface side 21 and two DSL ports 40 each coupled to a DSL pair as in FIG. 1. Each application port is configured for a different interface format. In particular, application port 24 is configured for an Ethernet format, application port 26 is configured for an Nx64k format, and application port 28 is configured for a G.703 format.

The input received over each DSL port 40 is sent to a respective DSL chipset 50 or 51. In this embodiment, DSL ports 40 are configured for G.SHDSL and chipsets 50 and 51 are G.SHDSL chipsets. Each DSL port is coupled to a separate remote DSL unit via a single pair. Hence, the DSL ports 40 and DSL chipsets 50 and 51 operate in single pair mode in this embodiment. The DSL chipsets 50 and 51 are coupled in a cascaded configuration and a pulse code modulation (PCM) interface 53 couples DSL chipset 50 to a custom field programmable gate array (FPGA) 70. Each DSL chipset 50 and 51 is configured to pull out a range of timeslots in a signal received from FPGA 70 via PCM 53. For example, in one embodiment, DSL chipset is configured to pull out and operate on timeslots 1-15 while DSL chipset is configured to pull out and operate on timeslots 16-31.

The plurality of application ports 22 and the DSL ports 40 are connected via the FPGA 70 and the DSL chipsets 50 and 51. Notably, although an FPGA is used in this example, embodiments of the present invention are not to be so limited. For example, in other embodiments, an application specific integrated circuit (ASIC) can be used.

The FPGA 70 and the DSL chipsets 50 and 51 are controlled by a central processing unit 60, which is responsible for configuration, status and error handling of the DSL unit 14. The FPGA 70 is the functional block responsible for handling timeslot allocation, and switching of timeslots between interface formats of the plurality of ports 22. A time switch 72 controls the time slot allocation as directed by the central processing unit 60.

When DSL unit 14 receives a signal over one of the application ports 22, the signal is passed to one of DSL chipsets 50 or 51 based on the point-to-multipoint configuration corresponding to the application ports 22. For example, if the Nx64k application port 26 is configured to couple to an Nx64k port in a remote unit coupled to DSL port 40-1, an Nx64k signal received over application port 26 is passed to DSL chipset 50.

In addition, an HDLC encoder/decoder 15 is provided between the Ethernet port 24 and the FPGA 70 to HDLC encode/decode an Ethernet signal. When an Ethernet frame is input at the Ethernet port 24, the frame is passed to HDLC encoder/decoder 15 where the sync byte and start of frame byte of the Ethernet frame are removed to form a stripped Ethernet port. The HDLC encoder/decoder 15 also appends a two byte CRC to the stripped Ethernet frame. HDLC flags with the pattern "01111110" are also inserted at the beginning and end of the frame.

Figure 8:
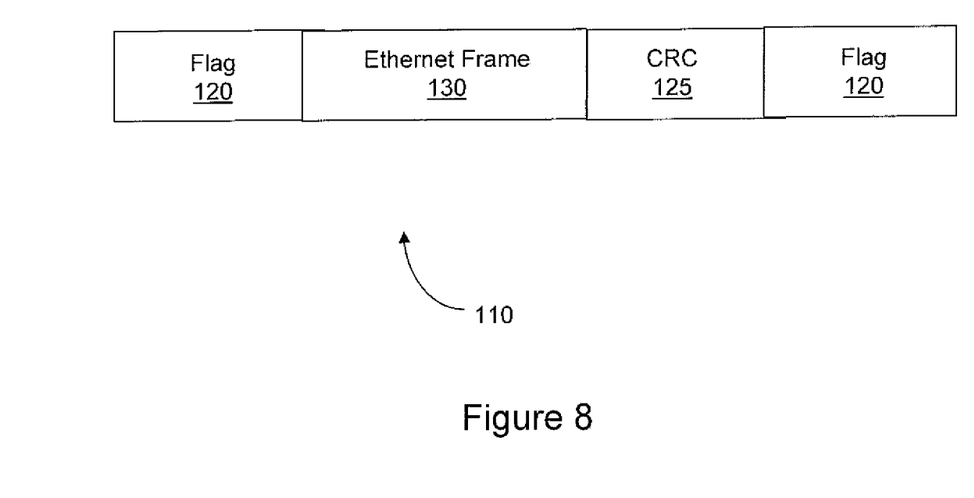
FIG. 8 shows one embodiment of the data structure of the high-level data link control encoding.

FIG. 8 shows one embodiment of the data structure 110 of the HDCL encoding. The data structure 110 includes the flag 120 which is one binary byte 01111110. The CRC 125 is 16 bits long and is created using the polynomial X16+X12+X5+1. The Ethernet frame 130 and the cyclic redundancy check 125 are bitwise checked. If a contiguous sequence of five ones (11111) are found, a zero is inserted so that no pattern between the start of the Ethernet frame 130 and the end of cyclic redundancy check 125 can resemble a flag (01111110). This prevents erroneous detection of flags within the Ethernet frame 130 or cyclic redundancy check 125. The HDLC flags are used to identify the start and end of a frame. The HDLC encoder/decoder 15 then inserts the encoded frame into a time division multiplex (TDM) byte stream and passes the TDM stream to FPGA 70.

Likewise, when a frame is prepared for egress from the DSL unit 14 via the Ethernet port 24, FPGA 70 extracts the corresponding timeslots from a PCM stream received from chipsets 50 and 51 and passes the timeslots to HDLC encoder/decoder 15 in a TDM byte stream. The TDM byte stream is examined in the HDLC encoder/decoder 15 for HDLC frames by searching for HDLC flags. When a frame is detected, HDLC encoder/decoder 15 removes the HDLC flags from the start and end of the frame. Similarly, the inserted "0" in the sequence "111110" is removed as well as the appended two byte CRC in HDLC encoder/decoder 15. Before removal, the CRC is used for error detection. HDLC encoder/decoder 15 then prepends the start of frame and sync bytes to the frame and passes the Ethernet frame to Ethernet port 24 where the frame is transmitted.

Once FPGA 70 allocates timeslots to the signals from application ports 22, the timeslots are passed to DSL chipsets 50 and 51 via PCM interface 53. Each DSL chipset 50 and 51 modulates and transmits its assigned timeslots over its corresponding DSL pair to another DSL unit similar to DSL unit 14. In the reverse direction, other DSL units transport timeslots to DSL unit 14 via one of DSL chipsets 50 and 51. FPGA 70 receives the timeslots via PCM interface 53 and switches the timeslots to the appropriate application ports 22.

In particular, FPGA 70 switches the timeslots based on the configured cross connects. For example, in one embodiment, the PCM stream contains bytes from a G.703 interface in one remote DSL unit and bytes from an Ethernet interface in another remote DSL unit. FPGA 70 is configured to map the bytes from the Ethernet and G.703 interfaces to Nx64k port 26.

In addition, FPGA 70 is configured, in some embodiments, to terminate timeslot 0 when receiving a structured G.703 signal from G.703 port 28 and to regenerate timeslot 0 when switching timeslots to G.703 port 28. When receiving an unstructured G.703 signal from G.703 port 28, FPGA 70 begins counting bytes from the beginning of the unstructured G.703 signal. For each byte FPGA 70 allocates a timeslot. In the reverse direction, FPGA sends the bytes as a continuous stream to G.703 port 28.

A user selects a mode of operation for the DSL unit 14 and configures point-to-multipoint selections (e.g. determines which application ports 22 are connected to which remote unit), data rate/timeslot allocation, and/or cross-connects with an application port in another DSL unit via a user interface 42. In one implementation of this embodiment, the user selects a data rate for transceived signals from a menu 66 via the user interface 42. The time switch 72 is initialized by the central processing unit 60 based on the interface formats selected for the point-to-multipoint connection and/or cross-connects so that a selected data rate is accommodated by the DSL unit 14.

The central processing unit 60 is communicatively coupled to a memory 64, which stores the menu 66 that includes the options for the data rate selection and the cross connect configuration. The central processing unit 60 is communicatively coupled to a storage medium 62. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

The central processing unit 60 executes software 88 and/or firmware that causes the central processing unit 60 to perform at least some of the processing described herein. At least a portion of such software 88 and/or firmware executed by the central processing unit 60 and any related data structures are stored in storage medium 62 during execution. Memory 64 comprises any suitable memory now known or later developed such as, for example, random access memory (RAM), read only memory (ROM), and/or registers within the central processing unit 60. In one implementation, the central processing unit 60 comprises a microprocessor or microcontroller. Moreover, although the central processing unit 60 and memory 64 are shown as separate elements in FIG. 3A, in one implementation, the central processing unit 60 and memory 64 are implemented in a single device (for example, a single integrated-circuit device). The software 88 and/or firmware executed by the central processing unit 60 comprises a plurality of program instructions that are stored or otherwise embodied on a storage medium 62 from which at least a portion of such program instructions are read for execution by the central processing unit 60. In one implementation, the central processing unit 60 comprises processor support chips and/or system support chips such as ASICs.

Figure 9:
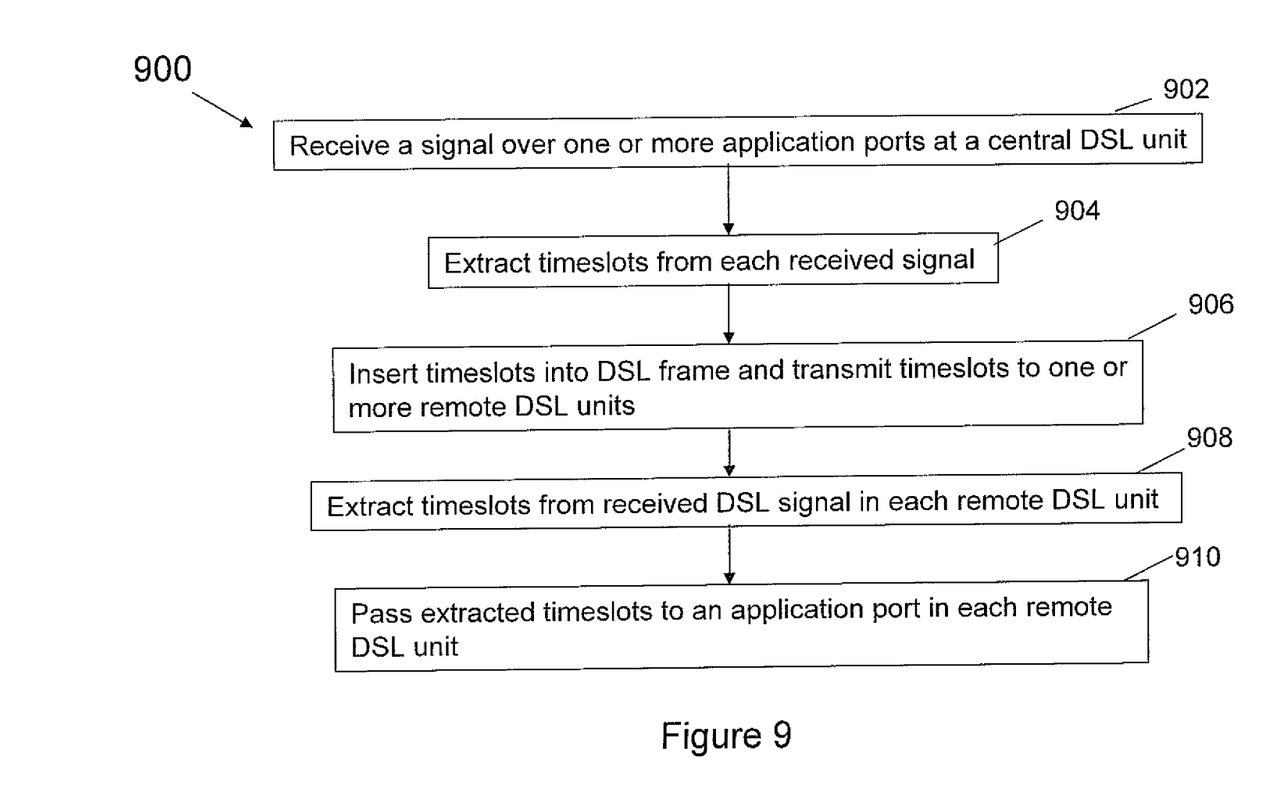
FIG. 9 is a flow chart depicting a method of communication in a network according to one embodiment of the present invention.

FIG. 9 is a flow chart depicting a method 900 of communicating in a network according to one embodiment of the present invention. Method 900 is used in a network such as networks 100, 200, 400, and 500 above. At 902, a signal is received over one or more application ports (for example, application ports 24, 26, and 28) in a central DSL unit (for example, DSL unit 14-1). Each signal is configured according to a particular interface format (for example, G.703, Nx64k, or Ethernet). At 904, the central DSL unit extracts timeslots from the one or more received signals. The number of timeslots extracted depends on the user selected data rate. In addition, with regards to a structured G.703 frame, in some embodiments, timeslot 16 is disabled and used for payload. Furthermore, extracting the correct number of timeslots from a structured G.703 frame includes terminating timeslot 0 in some embodiments. Extracting timeslots from an Ethernet signal involves various processes. An exemplary method of extracting timeslots from an Ethernet signal is shown in FIG. 10.

At 906, the central DSL unit inserts the extracted timeslots into at least one DSL frame and transmits the extracted timeslots from each signal to at least one of a plurality of remote units (for example, remote DSL units 14-2 and 14-3). In this embodiment, the central DSL unit transmits the DSL frame according to the G.SHDSL standard. Each of the plurality of remote DSL units is coupled to the central DSL unit via an independent DSL link. Each independent DSL link is associated with its own independent EOC channel. In one embodiment, the central DSL unit transmits a subset of extracted timeslots from a first signal to one remote DSL unit and another subset of extracted timeslots from the first signal to a second remote DSL unit. In another embodiment, the central DSL unit transmits timeslots extracted from a first signal to a first remote DSL unit and timeslots extracted from a second signal to a second remote DSL unit. Additionally, in some embodiments, the central DSL unit inserts a subset of extracted timeslots from a first and a subset of extracted timeslots from a second signal into one DSL frame using timeslot mapping as described above. The central unit then transmits the DSL frame to at least one remote DSL unit. In some such embodiments, timeslots from the first and second signal are passed to the same application port in the remote DSL unit.

At 908, the at least one remote DSL unit, which receives the DSL frame, extracts timeslots from the DSL frame. At 910, the at least one remote DSL unit passes the extracted timeslots to a corresponding application port based on an a priori assignment of timeslots to a particular application port. For example, in one embodiment, a remote DSL unit is configured to pass a first subset of received timeslots to a first interface application port and a second subset of received timeslots to a second interface application port. In addition, in some embodiments, passing the extracted timeslots to an application port includes using the extracted timeslots to generate at least one signal of a second interface format. The second interface format is dissimilar from the first interface format of the original signal received at the central DSL unit. In particular, the timeslots are switched to an application port of a dissimilar interface format. For example, in some embodiments, the at least one remote DSL unit regenerates timeslot 0 for generation of a structured G.703 signal from the extracted timeslots as described above. Additionally, an exemplary method for generating an Ethernet signal from the extracted timeslots is shown in FIG. 11.

Figure 10:
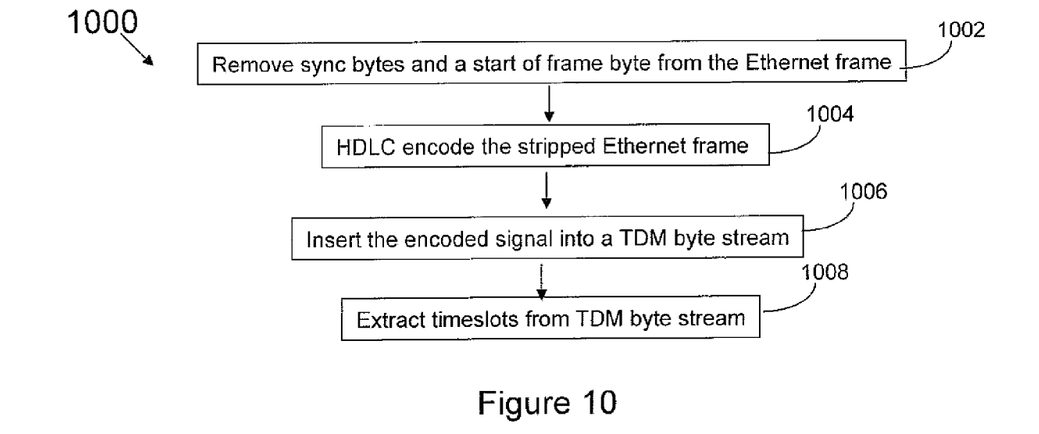
FIG. 10 is a flow chart depicting a method of extracting timeslots from an Ethernet signal in a DSL unit according to one embodiment of the present invention.

FIG. 10 is a flow chart depicting a method 1000 of extracting timeslots from an Ethernet signal in a DSL unit according to one embodiment of the present invention. At 1002, the sync bytes and the start of frame byte are removed from the Ethernet frame to form a stripped-Ethernet frame. At 1004, the stripped-Ethernet frame is HDLC encoded. HDLC encoding involves appending a two byte cyclic redundancy check (CRC) to the stripped Ethernet frame using the polynomial $X16+X12+X5+1$. The Ethernet frame plus CRC is then examined for a continuous bit sequence of five 1's (that is, 11111). HDLC flags with the pattern "01111110" are also inserted at the beginning and end of the frame. A zero is inserted at the end of each sequence of five 1's in the payload. Zero insertion after a sequence of five 1s in the payload is used to avoid confusion of payload with HDLC flags. At 1006, the HDLC encoded Ethernet frame is inserted into a TDM byte stream. At 1008, the timeslots are extracted from the TDM byte stream.

Figure 11:
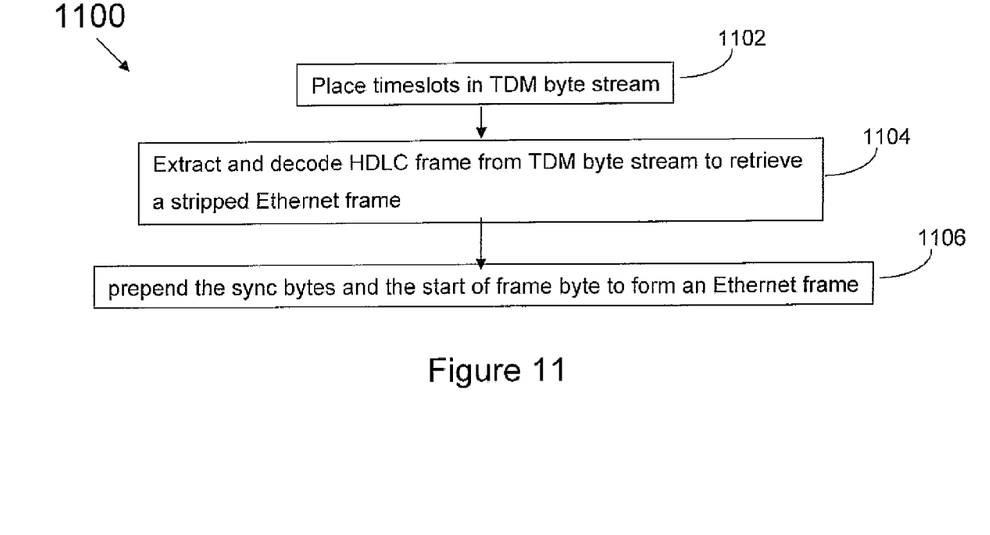
FIG. 11 is a flow chart depicting a method of generating an Ethernet signal from received timeslots in a DSL unit according to one embodiment of the present invention.

FIG. 11 is a flow chart depicting a method 1100 generating an Ethernet signal from received timeslots in a DSL unit according to one embodiment of the present invention. At 1102, the received timeslots are placed in a TDM byte stream. At 1104, an HDLC frame is extracted from the TDM byte stream and decoded to retrieve a stripped Ethernet frame. In particular, HDLC frames are located using HDLC flags. Decoding the HDLC frame involves removing the HDLC flags from the start and end of the frame. Similarly, a zero inserted in the sequence "111110" is removed as well as a two byte CRC to form a stripped Ethernet frame. Before removal, the CRC is used for error detection. The stripped Ethernet frame is then prepended with start of frame and sync bytes to form an Ethernet signal at 1106.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communication network comprising:
a first central digital subscriber line (DSL) unit having at least one application port and a plurality of DSL ports;
a first remote DSL unit having at least one application port and at least one DSL port, wherein the first remote DSL unit is communicatively coupled to the central DSL unit via a first single independent DSL pair having a first EOC channel; and
a second remote DSL unit having at least one application port and at least one DSL port, wherein the second remote DSL unit is communicatively coupled to the central DSL unit via a second single independent DSL pair having a second EOC channel;
wherein the at least one application port in the central DSL unit is communicatively coupled to an application port in at least one of the first remote DSL unit and the second remote DSL unit;
wherein the first central DSL unit is configured to receive a signal of a first interface format over the at least one application port, extract timeslots from the received signal, and transmit the extracted timeslots to at least one of the first remote DSL unit and the second remote DSL unit;
wherein the first remote DSL unit and the second remote DSL unit are each configured to use respective timeslots received from the first central DSL unit to generate at least one respective second signal of a dissimilar interface format.

2. The communication network of claim 1, wherein the first and second remote DSL units are configured to use the timeslots received from the first central DSL unit to generate more than one second signals, each of the second signals formatted according to a different interface format.

3. The communication network of claim 1, wherein the first and second remote DSL units are configured to use the received timeslots to generate at least one second signal of a dissimilar interface format by using one of timeslot range mapping and fractional timeslot mapping.

4. The communication network of claim 1, wherein the interface format for the at least one application port in each of the first central DSL unit, the first remote DSL unit and the second remote DSL unit includes one of an Ethernet format, a G.703 format, and an Nx64k format.

5. The communication network of claim 4, wherein each of the first central DSL unit, the first remote DSL unit and the second remote DSL unit is configured to remove timeslot 0 of a signal received from a G.703 interface format application port.

6. The communication network of claim 4, wherein each of the first central DSL unit, the first remote DSL unit and the second remote DSL unit further comprise an HDLC encoder/decoder configured to HDLC encode an Ethernet signal before timeslots are extracted from the Ethernet signal.

7. The communication network of claim 1, wherein the first central DSL unit is configured to allocate fractions of the at least one application port's total bandwidth to an application port in each of the first remote DSL unit and the second remote DSL unit.

8. A communication network comprising:
a first central digital subscriber line (DSL) unit having at least one application port and a plurality of DSL ports;
a first remote DSL unit having at least one application port and at least one DSL port, wherein the first remote DSL unit is communicatively coupled to the central DSL unit via a first single independent DSL pair having a first EOC channel;
a second remote DSL unit having at least one application port and at least one DSL port, wherein the second remote DSL unit is communicatively coupled to the central DSL unit via a second single independent DSL pair having a second EOC channel;
wherein the at least one application port in the first central DSL unit is communicatively coupled to an application port in at least one of the first remote DSL unit and the second remote DSL unit;
a second central DSL unit having at least one application port and a plurality of DSL ports;
a third remote DSL unit having at least one application port and at least one DSL port, the first remote DSL unit communicatively coupled to the second central DSL unit via a third single independent DSL pair having a third EOC channel; and
a fourth remote DSL unit having at least one application port and at least one DSL port, the fourth remote DSL unit communicatively coupled to the second central DSL unit via a fourth single independent DSL pair having a fourth EOC channel;
wherein the second central DSL unit is coupled to the first central DSL unit via the at least one application port in each of the second central DSL unit and the first central DSL unit.

9. The communication network of claim 8, wherein the at least one application port in each of the first remote DSL unit, the second remote DSL unit, the third remote DSL unit, the fourth remote DSL unit, the first central DSL unit and the second central DSL unit comprises a structured G.703 interface format.

10. The communication network of claim 8, wherein the second central DSL unit is configured to extract timeslots from a DSL frame received from each of the third and fourth remote DSL units, and map the extracted timeslots into a signal transmitted to the first central DSL unit via the at least one application port.

11. The communication network of claim 10, wherein the first central DSL unit is configured to extract the timeslots from the signal received via the at least one application port, and transmit the timeslots from each of the third and fourth remote DSL units to one of the firsts and second remote DSL units.

12. A digital subscriber line (DSL) unit, comprising:
a plurality of application ports;
two DSL ports, each DSL port associated with an independent embedded operations channel (EOC) and a single DSL pair;
wherein the DSL unit is configured to extract timeslots from a signal received over one of the plurality of application ports, transmit a first subset of the extracted timeslots to a first remote DSL unit coupled to one of the at least two DSL ports, and transmit a second subset of the extracted timeslots to a second remote DSL unit coupled to the other DSL port.

13. The DSL unit of claim 12, wherein the DSL unit is configured to use timeslots received over one of the two DSL ports to generate at least one signal formatted according to an interface format that is dissimilar from the original interface format of the received timeslots.

14. The DSL unit of claim 13, wherein the DSL units is configured to use the timeslots received over one of the two DSL ports to generate at least one signal by using one of timeslot range mapping and fractional timeslot mapping.

15. The DSL unit of claim 12, wherein the interface format for each of the plurality of application ports is one of an Ethernet format, a G.703 format, and an Nx64k format.

16. The DSL unit of claim 15, wherein the DSL unit is configured to remove timeslot 0 of a signal received from a G.703 interface format application port, and generate timeslot 0 prior to passing a signal to the G.703 interface format application port.

17. The DSL unit of claim 15, further comprising an HDLC encoder/decoder configured to HDLC encode an Ethernet signal before timeslots are extracted from the Ethernet signal.

18. The DSL unit of claim 12, further comprising:
a field programmable gate array (FPGA) configured to switch timeslots received over each of the two DSL ports to one or more of the plurality of application ports.

* * * * *